US008677171B2

(12) United States Patent
Bjerregaard et al.

(10) Patent No.: US 8,677,171 B2
(45) Date of Patent: Mar. 18, 2014

(54) METHOD FOR CONTROLLING THE DYNAMIC POWER SIGNATURE OF A CIRCUIT

(75) Inventors: Tobias Bjerregaard, Frederiksberg C (DK); Christian Place Pedersen, Bagsværd (DK); Martin Schwalbe Lohmann, Copenhagen Ø (DK); Mikkel Bystrup Stensgaard, Frederiksberg C (DK)

(73) Assignee: Teklatech A/S, Copenhagen (DK)

( * ) Notice: Subject to any disclaimer, the term of this patent is extended or adjusted under 35 U.S.C. 154(b) by 564 days.

(21) Appl. No.: 12/736,489

(22) PCT Filed: Apr. 14, 2009

(86) PCT No.: PCT/EP2009/054387
§ 371 (c)(1),
(2), (4) Date: Dec. 15, 2010

(87) PCT Pub. No.: WO2009/127613
PCT Pub. Date: Oct. 22, 2009

(65) Prior Publication Data
US 2011/0095801 A1  Apr. 28, 2011

Related U.S. Application Data

(60) Provisional application No. 61/071,114, filed on Apr. 14, 2008.

(51) Int. Cl.
*G06F 1/12* (2006.01)
*G06F 1/32* (2006.01)

(52) U.S. Cl.
USPC .......................... 713/500; 713/300; 713/503

(58) Field of Classification Search
None
See application file for complete search history.

(56) References Cited

U.S. PATENT DOCUMENTS

| 5,259,006 A | 11/1993 | Price et al. |
| 6,115,827 A | 9/2000 | Nadeau-Dostie et al. |
| 7,183,651 B1 | 2/2007 | Buhler et al. |

(Continued)

FOREIGN PATENT DOCUMENTS

WO  WO-2006128459 A1  12/2006

OTHER PUBLICATIONS

Vittal, Ashok, "Low-Power Buffered Clock Tree Design", IEEE Transactions on ComputerDesign of Integrated Circuits and Systems, vol. 16, No. 9, Sep. 1997, pp. 965-975.

*Primary Examiner* — Dennis M Butler
(74) *Attorney, Agent, or Firm* — Harness, Dickey & Pierce, P.L.C.

(57) ABSTRACT

A method of determining a timing relationship between modules on a chip, each module being timed by an initiator. The timing relationship being determined on the basis of the power consumptions over time of the initiators and may be determined on the basis of e.g. a sum of the power consumptions or more complex calculations also incorporating the signal path or power delivery network, whereby a voltage drop or current drawn at a position in the chip may be determined. In addition, a parameter, which may be the sum or voltage drop, current or e.g. an energy content within a frequency range, may be determined. This parameter may be varied by e.g. providing different timing relations of initiators, in order to minimize the parameter or adapt it to a requirement as a maximum peak value, maximum difference between max and min peaks, a flatness criteria or the like.

13 Claims, 3 Drawing Sheets

(56) References Cited

U.S. PATENT DOCUMENTS

| | | |
|---|---|---|
| 2004/0078766 A1 | 4/2004 | Andreev et al. |
| 2006/0053395 A1 | 3/2006 | Lai et al. |
| 2006/0236146 A1 | 10/2006 | Takahashi et al. |
| 2007/0106965 A1* | 5/2007 | Ohta et al. ............ 716/2 |
| 2007/0130552 A1 | 6/2007 | Inoue |
| 2008/0065923 A1 | 3/2008 | Arsovski et al. |
| 2008/0141062 A1* | 6/2008 | Yamaoka ............ 713/501 |

* cited by examiner

METHOD FOR CONTROLLING THE DYNAMIC POWER SIGNATURE OF A CIRCUIT

CROSS-REFERENCE TO RELATED APPLICATIONS

This is a National Stage of PCT Patent Application No. PCT/EP2009/054387, filed Apr. 14, 2009, which claims the priority under 35 U.S.C. §119 to U.S. Application No. 61/071,114, filed Apr. 14, 2008.

The present invention relates to the controlling of the shape of the dynamic power or current usage signature of an electronic circuit. In the following, power signature, current signature, as well as power and current models are interchangeable definitions for the same general idea, i.e. the signature of the power or current usage of a circuit, design, sub circuit, sub module or sub design, as it evolves dynamically over time.

Today, the wide majority of electronic data processing circuits are synchronously controlled, i.e. controlled by one or more timing reference signals, so called clocking signals or simply clocks. As such, power consuming activity in different parts of the circuit is synchronized, being initiated by events on such a clocking signal. In the following, a clock or a clocking signal refers to a master timing reference. This means that two signals with different wave form and period may still be aligned relative to the same master reference signal, and hence be considered belonging to the same clocking domain, if there exists a more or less steadfast phase skew and/or repeating periodic behaviour between the two signals.

Synchronous operation is vastly useful as it allows a number of benefits, e.g. in synthesizing and verifying circuit behaviour. In general, it is an object during physical implementation, to create a clock distribution network that results in the delivery of a clock signal, where the events on the delivery end points of that signal are occurring simultaneously throughout the circuit.

Figure 1:
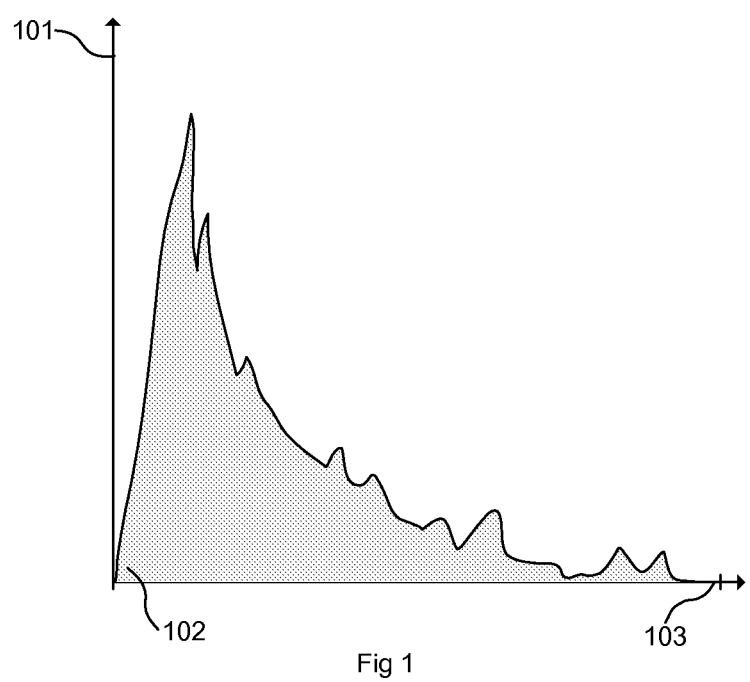

A major drawback of synchronously operating circuits is the high dynamic content of the current being drawn into the circuit, e.g. through the power supply. FIG. 1 illustrates a current signature. The vertical axis (101) indicates the current or power level. The horizontal axis indicates time after the clock event. As illustrated in the figure, when the clock event occurs, the circuit starts drawing current (102) because a data processing activity starts, and by the time the clock period is at its end (103), the current being drawn due to processing will be zero, as all circuits will have finished processing data. Typically, the dynamic current signature of an initiator, i.e. the current signature related to an initiating event such as a clocking signal event, will express a peak close to the initiating event. When the circuit is operating in a synchronous fashion, the peaks of different initiators, relating to the same master reference clock, may overlap and accumulate. This can result in a high dynamic content in the accumulated current signature, resulting in serious issues related to noise, dynamic IR drop peaks, power delivery integrity and more. The current signature may have any shape, the general idea being that peaks in the signatures may overlap, causing large accumulated peaks.

In current technologies, these peaks in the power signature are dealt with at the physical level, by inserting decoupling capacitance which has a low pass filtering effect [US2007130552, U.S. Pat. No. 7,183,651]. Drawbacks of this method may include increased component cost, increased leakage power consumption in the decoupling capacitors, reduced predictability in the design process, and more. Methods have also been shown that target a spreading of the clock events in a circuit with the object to reduce clock noise [US2008065923]. This method however addresses only clock noise, and sees clock events as discrete noise generating events. This is not realistic as the current drawn in the data processing circuit, following a clock event, is not taken into account. Hence a simple spreading of the clock events according to a desired arrival time distribution is not sufficient in addressing the challenges at hand. In fact this approach will not capture the actual problems due to the complex shape of power signatures of complex design blocks. Furthermore, prior art has failed to fulfillingly innovate methods to restore the timing reliability of a circuit after changing the clock timing, and has hence a very limited range and flexibility.

The present invention provides a novel method of controlling the dynamic power usage, which enables the ability to shape e.g. the dynamic current usage in a system, in order to obtain a certain characteristic, e.g. to minimize the dynamic content of the signature, the level of the current peaks, the slope or length of the current transients, the energy content of a certain frequency range, or other characteristic. By calculating the voltage drop in the power delivery network and the current in different branches of the power delivery network, for example, on the basis of the dynamic power usage of the modules, the physical positioning of the modules and the electrical properties of the power delivery network, it is possible to determine a control of the dynamic use of power and a physical placement of the modules in order to obtain a characteristic of the voltage and/or the current in the power delivery network, such as those characteristics mentioned above. Further, the substrate of the chip can be modelled, and the coupling of noise from the power delivery network and/or the signal lines in the circuit into the substrate can be calculated, and the substrate noise coupling between the power shaped part of the circuit and other (receptive) parts can be determined and minimized. This could be a coupling of digital switching and power delivery network noise into analogue parts of the same system. This is particularly beneficial for systems combining digital circuitry and analogue circuitry, so called analogue mixed-signal systems. In such systems it is in general beneficial to minimize the noise in the frequency ranges in which the analog circuits are most sensitive. As an example, it is particularly useful to minimize noise in specific frequency ranges such as around 900 MHz for GSM-900, 1800 MHz for GSM-1800, 2.4 GHz for Bluetooth, WiFi and cordless phones, 865 MHz, 915 MHz and 2.4 GHz for Zig-Bee, and other well known frequency ranges for other well known wireless specifications. It is also beneficial to minimize noise in specific frequency ranges in systems that are not meant for wireless applications and even for chips which are purely digital, such as chips for the automotive industry for which there exist specifications as to how much noise these are allowed to produce in given frequency ranges.

The present invention allows this optimization. In effect, the noise in the system as well as the voltage drop in the power delivery network can be reduced effectively. This has a number of benefits such as better production yield, improved reliability of operation, etc. of microchips and other electronic circuits such as printed circuit boards. Further, the invention provides a method to reestablish timing reliability in the circuit, with the directly related benefit of increased flexibility and range of the power shaping.

In a first aspect, the invention relates to a method of determining a timing or clock signal flow or path of a synchronously controlled circuit or sub circuit comprising a plurality of initiators, the method comprising:

determining or estimating, for each initiator, a power consumption over time in relation to an event of the initiator, e.g. clocking or timing pulse/period/cycle, and estimating, on the basis of the determined or estimated power consumptions, a timing relationship between the initiators so that a parameter determined on the basis of the power consumptions fulfils a predetermined criteria.

In the present context, a timing or clocking signal may be any periodic signal, such as a square signal typically used for clocking individual parts of chips. Normally, the signal period will comprise one or more edges on which the circuits actually act.

In this connection, a flow or path of a signal normally will be that of or intended to be followed by a signal, such as a clocking signal. This path or flow normally is defined by (existing or intended) electrical conductors and individual elements, such as gates, buffers, of the like, and describes the distribution of the signal from normally a single source to a number of receiving elements, normally one in each part of the chip or circuit.

Normally, "synchronously controlled" elements or circuits are controlled or clocked by a single clocking or timing signal. This signal may be delayed or otherwise altered (such as shifted up or down in frequency), but will determine or clock all relevant parts of the circuit.

In this connection, a circuit or sub circuit normally will be all of or part of a chip, such as an ASIC or a model describing a chip or ASIC. A sub circuit will be a part of an overall circuit, but it is noted that not all part of a chip or ASIC need be part of the synchronously controlled elements timed by the present aspect of the invention. A chip or ASIC may have multiple individually synchronously controlled circuits or sub circuits, and each of these may be corrected according to this aspect of the invention, and other parts may not be desired altered at all.

In the present context, an initiator is a clock input on a module and events of the initiator determines the shift in time of the power or current signature related to the initiator. The power consumption in given elements or cells in the circuit may be triggered by events of i one or a plurality of initiators, and thus the cell may belong to several different initiator domains.

Naturally, the definition of initiators may be made according to any rules or desires. Also, the definition of modules of the circuit may be made according to any rules. Normally, the cells within a given module which are triggered by events of the same master reference clock would relate to the same initiator.

The determination or estimation of the power consumption of an initiator over time may be performed on the basis of existing knowledge or empirically. Normally, the gates and library cells of a LSI, VLSI or other chip manufacturing techniques are well categorized, and the power consumption following a clocking edge or the like may be determined from knowledge of the gates involved and their interrelation. Alternatively, the power consumption over time may have been pre-determined.

Thus, the power consumption of each initiator is determined usually following a clocking or timing pulse, edge or the like, of that initiator. This power consumption may be represented by a graph. Normally, the operation of the initiator is repeated in each clocking/timing cycle, so that the power consumption will repeat itself in each cycle.

In one embodiment, the power consumption over time of all initiators may be combined or added to provide an overall power consumption of the combined initiators of the circuit. In this simple embodiment, the sum of the power consumptions may be evaluated.

In another embodiment, the parameter is a voltage drop or a current drawn at a predetermined position within the circuit or sub-circuit. This position may be in a clock or power supplying path.

In yet another embodiment, the parameter is a model of noise generated in a substrate based on the power consumptions. Usually, this noise is generated by the circuit and emitted via the substrate.

In yet another embodiment, the parameter may be a model of noise generated by the circuit, such as EMI or EMC noise.

Of course, the parameter may be combination of the different types of parameters mentioned above.

Naturally, this parameter will change, if the timing relationship between individual initiators is changed so that the timing or clocking signal/pulse/edge arrives at a selected initiator sooner or later, e.g.

Thus, shifting the individual arrival times of clocking pulses/edges or the like at individual initiators, the parameter will vary.

Thus, in one embodiment, the parameter is determined during an iterative process, where a timing delay is determined for one or more initiators, the parameter is determined on the basis of the power consumptions and the timing delay(s), and adapted timing delay(s) is/are determined on the basis of the parameter determined in this and/or any previous steps of the iterative process.

In another embodiment, the timing relationship is determined by a discrete search method, such as within a predetermined searching space for the timing relations, normally within a single clocking cycle.

Thus, these timing relationships may be determined so that the parameter fulfils predetermined criteria.

In one embodiment, a predetermined criterion is a flatness criteria, a criteria as to a maximum distance between a minimum and a maximum of the parameter over time, such as within the clock cycle, a maximum variation of the parameter. Therefore, the individual timing relations or delays or the like of the timing/clocking signals may be varied to obtain a parameter fulfilling the requirements.

Then, demands may be put and obtained as to how flat and non-varying the parameter may be, such as over a clocking cycle, or how few or small variations of the parameter are accepted, or the like. Any requirement may be defined, and the determination thereof and the parameter is simple.

In another embodiment, a predetermined criterion is a criterion of reducing the maximum, such as current or power, peaks of the parameter during operation of the circuit.

In another embodiment, a predetermined criterion of the parameter is an energy content within a predetermined frequency range. This energy content may be determined from the parameter in any other suitable manner.

Also, a simple minimization (within given criteria, such as step length in an iterative process) may be used.

In yet another embodiment, the criteria described above or other criteria may be applied for a given portion of the circuit, with the desire to fulfil the criteria within this given portion of the circuit. Several portions may be defined, and the criteria may be applied to all, either individually or as a combined effort.

Also, a number of criteria may be combined in order to describe the desired characteristics of a circuit.

Naturally, the physical position or placement of initiators and corresponding modules may have an effect on the parameter, as the distance between initiators/modules will have an effect on voltage drop and the like. Thus, the iteration of the timing relationships may also comprise an iterative physical positioning if the initiators/modules. Thus an iteration comprising re-positioning of the initiators/modules automatically will be an iteration of the parameter, if a parameter is selected which depends on the physical positions.

Naturally, the individual timing relationships may be determined from a backward calculation starting out with the requirements and then directly calculating the individual timing relations, or a more brute force method may be used in which all timing relations between all initiators are tested to determine the timing relations either fulfilling the requirement set up or which is the closest to do so.

Naturally, the resulting timing relations may be incorporated in the chip in a number of manners.

In one situation, the method further comprises the step of determining physical positions of the modules on a chip on the basis of the estimated timing relationships of the initiators of these modules. In this manner, the distance over which the timing/clocking signals travel may result in the desired timing relations.

In addition or in another situation, the method further comprises the step of determining, on the basis of the estimated timing relationships, a path of the timing or clock signal between the sub modules. Thus, in addition, the path may be made even longer or otherwise adapted to further act on the timing relationship. In addition, it may be desired to transport the timing/clocking signal to one module via another module, in order to obtain the desired timing relation.

Also, or alternatively, the method may further comprise the step of providing one or more additional electrical elements in a timing path between two initiators, the electrical element being adapted to provide a timing relationship corresponding to the estimated timing relationship between the two initiators. Thus, instead of simple distance or relaying, actual elements, such as gates, buffers or the like, may be used which in themselves provide a delay of the signal. A particularly interesting type of gate and use thereof may be seen in the below second aspect of the invention.

In another aspect, the invention relates to a method of providing a predetermined timing relationship between two initiators of a chip, the initiators being clocked/timed by the same clocking/timing signal, the method comprising:
  identifying the two initiators by identifying two initiator domains adapted to transmit data to each other, a second of the initiator domains comprising a receiving means adapted to receive data and being clocked by a first clocking edge of the clocking signal, a first of the initiator domains comprising a transmitting means adapted to transmit data to the receiving means and being clocked by the first clocking edge,
  inserting in the data path between the transmitting means and the receiving means a buffering element adapted to receive data from the transmitting means and to output the data to the receiving means when clocked by a second clocking edge of the clocking signal.

Consequently, it is seen that performing the method of the first aspect may bring about the problem or situation that data transport between two initiator domains may have been made difficult by the timing relationship between the two initiators. This may be corrected or handled by the method of the second aspect, as inserting such a buffering element, the timing reliability of the data transmission between the two initiator domains can be made arbitrarily robust by appropriately adjusting the clock signal wave form, since the clock phase times will be introduced into the timing requirement equations of the transmission path. This is particularly useful when the receiving means is clocked later than the transmitting means, in which case there may arise unreliable transmission due to hold time issues.

Naturally, the method of the second aspect may be used also in other situations, such as those brought about in US 2008/0065923, as this aspect of the invention handles timing relationships caused by any method.

While the positioning of the buffering element in the data path between the transmitting and the receiving means may be chosen arbitrarily, it would normally be advantageous to position it so that the buffering element is placed timing wise largely half way between the transmitting and receiving means, so as to not impair the performance of the data path.

As an alternative to the edge triggered buffering element described above, a level sensitive buffering element such as a latch can be employed. In this case it may be easier to ensure optimal performance, as the exact positioning of the element in the data path between the transmitting and receiving means is not as critical because the buffering element lets data pass through during one phase of the clocking signal.

With regards to ensuring the hold time of the data path, if the buffering element is largely triggered by the initiator of the receiving means, i.e. related to the same initiator domain as the receiving means, the element should open on the first clocking edge and close on the second. On the other hand, if the buffering element is largely triggered by the initiator of the transmitting means the element should open on the second clocking edge and close on the first. This is so in order to secure the hold time requirement of the receiving means.

The data path between the transmitting and receiving means may contain several branches, each with different timing. One method for placing the buffering element is to first identify the hold time critical receiver. The data path can then be traversed backwards towards the transmitter, following hold time critical branches (not all branches need be hold time critical) and identifying the optimal point to place the buffering element, with regards to the performance of the data path. The performance may be calculated by looking at the setup time equation of the data path, the object being to not impair the setup time requirement of the receiver. Alternatively, the transmitter of a hold time critical path may be identified, and the data path can be traversed in a forward (data flow wise) direction, towards the receiver, identifying hold time critical branches and finding the optimal insertion point in this manner.

Figure 2:
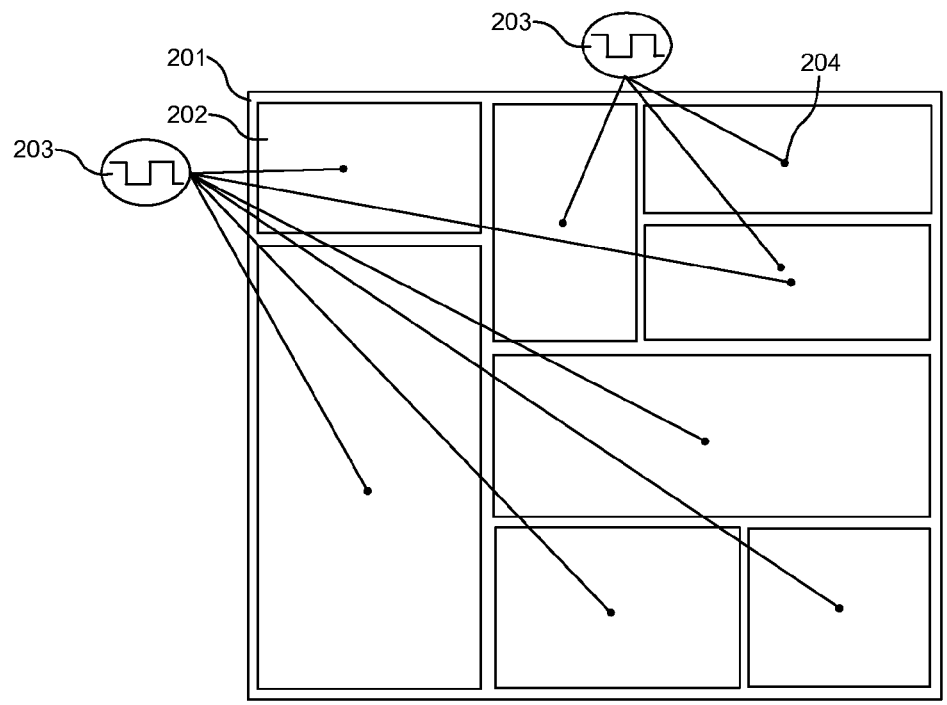
Figure 3:
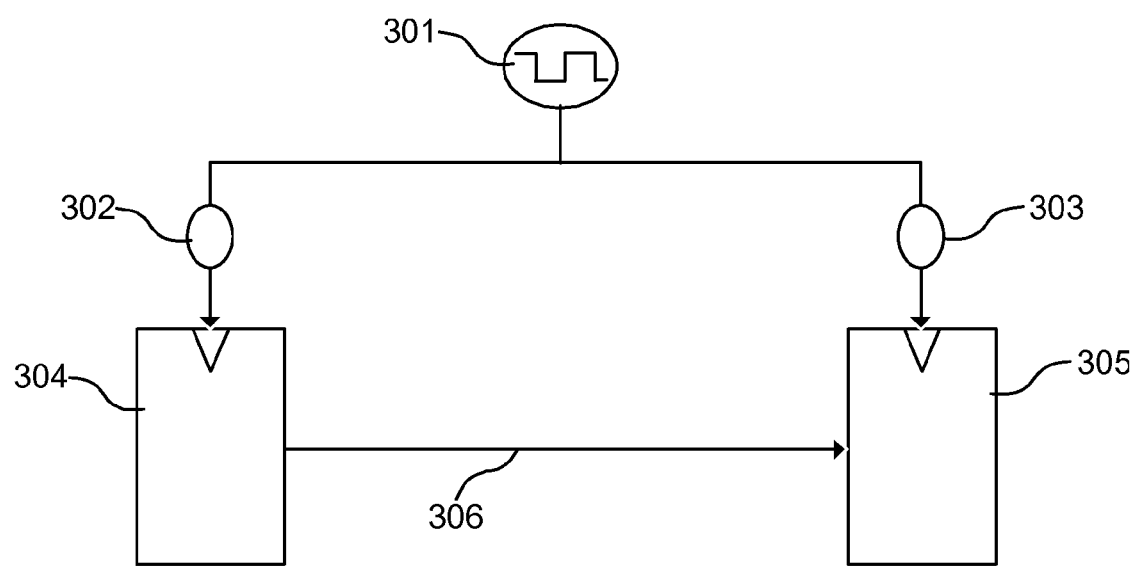
Figure 4:
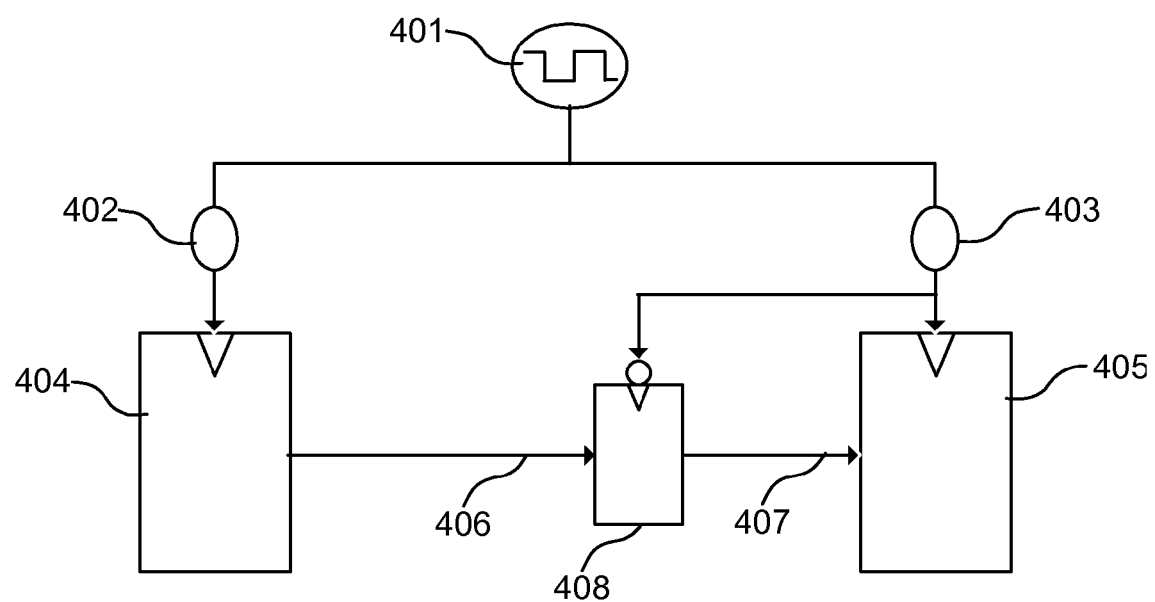

In the following, preferred embodiments are described with reference to the drawing, wherein:

FIG. 1 illustrates a current signature or power consumption over time within a single clock cycle, FIG. 2 illustrates a typical processing system comprising a number of modules, FIG. 3 illustrates two initiator domains communicating with each other, and FIG. 4 illustrates the inventive "rigging", allowing this communication while ensuring correct timing relationships and a flat power consumption curve.

POWER SHAPING

As illustrated in FIG. 2, a data processing system (201) can be partitioned in a number of modules (202). Also present in the system is one or more timing reference signals, or master clocks (203). All modules receiving a timing reference signal related to the same master clock are said to belong to the same clock domain. A module may belong to more than one clock domain, if its internal activity is controlled by reference timing signals related to different master clocks. The clock input(s) (204) of a given module is referred to as the initiator(s) of that module. As such, an initiator is defined by a clocking signal as well as a module to which the clocking signal is delivered. The combined circuits related to the timing of an initiator may also be denoted as an initiator domain. The power signature of a given initiator or initiator domain is thus a characterization of the power usage in the system, due to the chain of events initiated by an event of the initiator. Hence, the power signature related to a given initiator/initiator domain may be due to power used also in other modules than the module defining the initiator, if the chain of events rolls out to these other modules, e.g. if the modules are interconnected with the initiator module. Also, a given cell or module in the system may belong to one or more than one initiator domain.

A power signature may be a characterization of the power usage over time, initiated by a given initiator. It may also be a characterization of the current being drawn by the circuit over time, e.g. through the power supply network, a characterization of the current flowing out of the circuit over time, e.g. through the ground network, or other similar characterization, or a combination of any of these. In particular the signature of the current flowing in and out of the circuit can be useful in assessing the noise and voltage drop in the power and ground network.

When the power signature of each initiator in the system is characterized, the accumulated power signature of the system can be assessed by adding the individual power signatures, or by calculating their influence on the power delivery network (the voltage drop in the power delivery network or the currents flowing in branches of the power delivery network) or the noise generated in other parts of the system such as through substrate coupling or electro magnetic interference or conductance. By timing or delaying events on the initiator signals individually, the power signatures are shifted in time relative to each other, and it is possible to shape the accumulated power signature, to obtain a certain characteristic in the signature, e.g. a flattening of the current peaks. By taking into account information about the physical location of the modules, or by controlling the physical location of the modules, it is also possible to maximize flattening within specific local regions.

Determining the required initiator delays (the distribution of delays across the group of initiators in the system, or simply the delay distribution) to obtain a certain characteristic, can be done in a number of ways, and this invention is not limited to a specific approach. One approach, often used to solve highly complex problems, is to use simulated annealing. A cost function is designed, e.g. accumulating the power signatures, either globally or locally, and determining the maximum peak, the maximum transient or the dynamic content of the accumulated signature(s). This cost function is embedded into the annealing engine, and the annealer will produce a delay distribution which seeks to minimize the cost function.

Alternatively, a design space may be explored and a suitable delay distribution may be found, simply by making an exhaustive search through all or a discrete subset of possible combinations of initiator delays, to find the result which produces the best power signature according to a given criteria, e.g. lowest power peak, most flat transient, smallest energy content at a given frequency or other criteria.

A set of limitations or constraints may apply to the delay distribution of the initiators. These may be derived by analyzing the system. The delay of any intiator(s) may be limited to a given range or completely fixed due to a number of design issues, or the skew between two or more given initiators may be limited to a given range, or even fixed. These constraints may be due to timing issues, geometrical or physical issues, implementation issues, or other design or functionally related issues. Taking such constraints into account, the resulting design space may be explored, either by analytical, random, annealing, search-based or other approach, to derive a delay distribution which ensures a maximum benefit, while still ensuring that the design constraints are respected.

Coupling the physical floor plan and the delay distribution of the initiators can be done in a number of ways. The two may either be approached as independent tasks. The deducted delay distribution may then be used as input to a clock signal distribution synthesis, e.g. a CTS (clock tree synthesis) method.

Alternatively, a given clock distribution network in a system may result in a given geographical delay distribution across the physical area of the system, e.g. the circuit board or the integrated circuit. In order to obtain the benefits of power shaping, a floor plan of the system modules across this area and a binding between the module clock ports and the clock signal distribution network may be found. Normally it would be desirably, though not necessary, to aim for the clock ports and the binding point in the clock distribution network, to be physically close.

As such, in order to optimize the dynamic power signature of a circuit, the invention relates to any one of the following methods, alone or in combination:

Determining a delay distribution for a given logical system topology or physical system floor plan.

Determining a floor plan for a given clock distribution network resulting in a given geographical delay distribution.

Determining a set of bindings between initiator ports and such a given clock distribution network.

One particular use of the methods described involves distributing the clock in a network-type topology, according to the method described in e.g. EP1891497, and then:

For a given clock network, placing the modules and binding their clock ports to nodes in the network, such that a given cost function is minimized.

For a given floor plan, creating a clock network and a set of bindings such that a given cost function is minimized.

Reestablishing Timing

When the initiators are skewed relative to each other (delayed differently), the timing of data or control carrying signals, may be changed. FIG. 3 illustrates a simple view of this. A master clock (301) feeds through independent initiator delays (302 and 303) to a start point register (304) and an end point register (305) of a data path (306). If the delay in the data path is low, the end point register may experience a hold time problem, and the data path is said to be hold time critical. On the other hand, if the delay in the data path is high, the end point register may experience a setup time problem, and the data path is said to be setup time critical. If the end point register is triggered later than the start point register, e.g. due to its initiator delay (303) being higher than that of the start point register (302), the hold time of the data path is impaired. The data path is being made more hold time critical. On the other hand, the setup time is improved, i.e. the data path is being made less setup time critical. Inversely, if the end point register is triggered earlier than the start point register, the data path is made more hold time robust and while being made more setup time critical.

If a hold time is impaired it affects the robustness of the system and it may be necessary to re-establish the hold time robustness of the system. This can be done in a number of ways. In current technologies normally hold time critical timing is fixed by inserting extra delay buffers in hold time critical branches of the circuit. If the hold time violation is of a high magnitude, it is not attractive to use this method as it becomes too expensive in terms of area and power usage of the delay buffers. Also, the method is sensitive to timing variability in both the clock and the data path. An aspect of the present invention is a method to insert inverse edge triggered flip flops, registers or latches in these hold time critical branches. We refer to this as 'rigging'. FIG. 4 illustrates the concept with an example of a positive edge triggered data path rigged with a negative edge triggered register. The master clock (401) clocks a positive edge triggered start point register (404) and a positive edge triggered end point register (405) through initiator delays (402) and (403) respectively. To improve the hold time robustness of the system, the data path is split into two segments (406 and 407), and a negative edge triggered register is inserted. This makes the system robust to the difference in delays between the initiator delays (402 and 403). The rigging register may alternatively be chosen to be triggered by the transmitting register initiator (through the delay 402). Also it may be chosen to be a level sensitive element such as a D-latch or similar state holding element.

Rigging can thus be used to make circuits arbitrarily robust to timing variations, whether these occur in the data signal paths or in the clock distribution network.

While rigging a data path can secure the hold time, it may also impair the setup time of that data path. In order not to impair the setup time requirements of the data path, the splitting point of the data path has to be carefully chosen, balancing the delay of sub paths (406) and (407).

If a setup time requirement is impaired it may affect the performance of the system, reducing the maximally attainable clock frequency. To be sure not to reduce the performance of the system when performing power shaping, it is necessary take into account timing issues, relate these to the delay distribution, and constrain to the resulting delay distribution.

The invention claimed is:

1. A method of determining a timing or clock signal flow or path of a synchronously controlled first circuit comprising a plurality of initiators and a plurality of modules, each module comprising at least one of the initiators at which the module receives the timing or clock signal, each module further comprising one or more second circuits, each of the one or more second circuits operating according to a timing of one of the initiators, the method comprising:
determining, for each of the initiators, a power consumption over time in response to a clocking or timing pulse/period/cycle/event of each initiator, each of the determined power consumptions being one of an actual power consumption and an estimated power consumption; and
estimating, on the basis of the determined power consumptions, a timing relationship between the initiators so that a parameter based on the determined power consumptions fulfills at least one desired criterion, wherein the determining comprises,
determining a power consumption over time for any of the second circuits that operate according to a same initiator.

2. A method according to claim 1, wherein the estimating comprises determining the parameter as one of (i) a voltage drop or a current at a desired position of the first circuit and (ii) a noise generated by the first circuit or through a substrate of the first circuit.

3. A method according to claim 1, wherein the timing relationship is determined according to an iterative process that comprises,
determining a timing delay for one or more of the initiators,
determining the parameter on the basis of the determined power consumptions and the timing delay(s), and
determining adapted timing delay(s) on the basis of the determined parameter.

4. A method according to claim 1, further comprising determining physical positions of the modules on a chip on the basis of the estimated timing relationships.

5. A method according claim 1, further comprising determining, on the basis of the estimated timing relationships, a path of the timing or clock signal between the initiators.

6. A method according to claim 1, further comprising providing one or more additional electrical elements in a timing path between two of the initiators, the one or more electrical elements being configured to provide a timing relationship corresponding to the estimated timing relationship between the two initiators.

7. A method according to claim 1, further comprising:
providing a desired timing relationship between two of the initiators on a chip, the two initiators having domains being clocked by the same clocking signal;
identifying the two initiators by identifying two initiator domains configured to transmit data to each other, a second one of the initiator domains comprising a receiver configured to receive data and being clocked by a first clocking edge of the clocking signal, a first one of the initiator domains comprising a transmitter configured to transmit data to the receiver and being clocked by the first clocking edge, and
inserting, between the transmitter and the receiver, a buffering element configured to receive data from the transmitter and to output the data to the the receiver when clocked by a second clocking edge of the clocking signal.

8. A method according to claim 1, further comprising:
providing a desired timing relationship between two of the initiators on a chip, the two initiators having domains being clocked by the same clocking signal;
identifying the two initiators by identifying two initiator domains configured to transmit data to each other, a second one of the initiator domains comprising a receiver configured to receive data and being clocked by a first clocking edge of the clocking signal, a first one of the initiator domains comprising a transmitter configured to transmit data to the receiver and being clocked by the first clocking edge, and
inserting, between the transmitter and the receiver, a buffering element configured to receive data from the transmitter and to output the data to the receiver, the buffering element being further configured to pass the output data through during one clocking phase and retain the output data during the other clocking phase.

9. A method according to claim 7, further comprising:
triggering the buffering element at a substantially same time as the receiver, and
passing, by the buffering element, the output data through during the clocking phase starting at the first clocking edge and ending at the second clocking edge, while retaining the output data during the other clocking phase.

10. A method according to claim 7, further comprising:
triggering the buffering element at a substantially same time as the transmitter, and
passing, by the buffering element, the output data through during the clocking phase starting at the second clocking edge and ending at the first clocking edge, while retaining the output data during the other clocking phase.

11. A method according to claim 7, further comprising determining a placement of the buffering element in branches of the data path between the transmitter and the receiver such that a hold time requirement of the receiver is improved while the setup time requirement is impaired minimally.

12. A method for shaping the power signature of a synchronously controlled first circuit comprising a plurality of modules and a plurality of initiators, each module comprising at least one of the initiators and one or more second circuits, each of the second circuits operating according to a timing of one of the initiators, the method comprising:
- determining power signatures relating to each of the plurality of initiators of the plurality of the modules in the first circuit; and
- skewing a delay of each initiator independently, wherein the determining comprises,
- determining a power signature based on a power consumption over time for any of the second circuits that operate according a same initiator.

13. A method according to claim 12, the method comprising:
- analyzing a timing of data signals in the first circuit; and
- determining at least one of a valid range of delays for individual initiator signals and a range of valid skews between two initiator signals in the circuit based on the timing of the data signals.

* * * * *